United States Patent [19]
Fuchslin

[11] 3,894,420
[45] July 15, 1975

[54] TIRE CHECKING MACHINE

[76] Inventor: Richard L. Fuchslin, 265 N. Almond St., Dixon, Calif. 95620

[22] Filed: Aug. 5, 1974

[21] Appl. No.: 494,470

[52] U.S. Cl.................................... 73/45.6; 73/49
[51] Int. Cl.² ........................................ G01M 3/06
[58] Field of Search ........ 73/45.5, 45.6, 45.7, 45.8, 73/49, 146; 214/1 A

[56] References Cited
UNITED STATES PATENTS

| | | | |
|---|---|---|---|
| 2,883,858 | 4/1959 | Bishman | 73/45.6 |
| 2,982,126 | 5/1961 | Branick | 73/45.6 |

*Primary Examiner*—Donald O. Woodiel
*Assistant Examiner*—John S. Appleman
*Attorney, Agent, or Firm*—Lothrop & West

[57] ABSTRACT

A machine for checking vehicle tires, mounted or not, includes a water tank having upstanding sides and adapted to rest on the floor. There is a ramp leading from the floor substantially to the top of one of the tank sides. A frame adjacent the tank includes a carrier having a horizontal arm and having an inverted U-shaped arm pivoted to the frame about a fulcrum shaft. On the horizontal arm is a pair of rollers spanning two substantially identical side members included in the arm. There is an air-operated jack connected to the frame and to the inverted arm so that the carrier can be moved between one position in substantial alignment with the ramp and out of the water in the tank and a second position with the horizontal arm in the water in the tank. The positions shift the center of gravity of a tire resting on the rollers between a position above the tank and a position substantially above the ramp. A swinging rod on the carrier can be moved from an inactive position at one side to span the side members of the carrier so as to overlie an inner tube resting on the rollers in order to hold the inner tube down as it is being lowered into the water in the tank.

6 Claims, 4 Drawing Figures 3,894,420

SHEET 1

TIRE CHECKING MACHINE

While manual handling of some tire casings mounted on wheels and the handling of inner tubes separately in many instances is not difficult, there is a problem when the size and weight of a tire and wheel; for example, those of a tractor, are to be inspected for leaks and the like.

It is therefore an object of the invention to provide a tire checking machine effective to assist in the handling of a mounted tire casing and placing it in position for inspection and then removing it after inspection for use. Also, the mechanism is available for use in checking a separate inner tube when that is required.

It is therefore an object of the invention to provide a tire checking machine effective to carry out the steps of checking relatively heavy tire casings or inner tubes.

A further object of the invention is to provide a tire checking mechanism that can readily be set up, mounted, and used in any desired environment.

Another object of the invention is to provide a tire checking machine that can easily be incorporated with other handling devices in a tire shop.

A further object of the invention is to provide a tire checking machine in which the parts are simple and straight-forward and consequently can be expected to afford satisfactory operation and a long life.

A still further object of the invention is to provide a tire checking machine that is relatively cheap to manufacture and requires little maintenance.

Other objects, together with the foregoing, are attained in the embodiment of the invention described in the accompanying description and illustrated in the accompanying drawings, in which.

Figure 1:
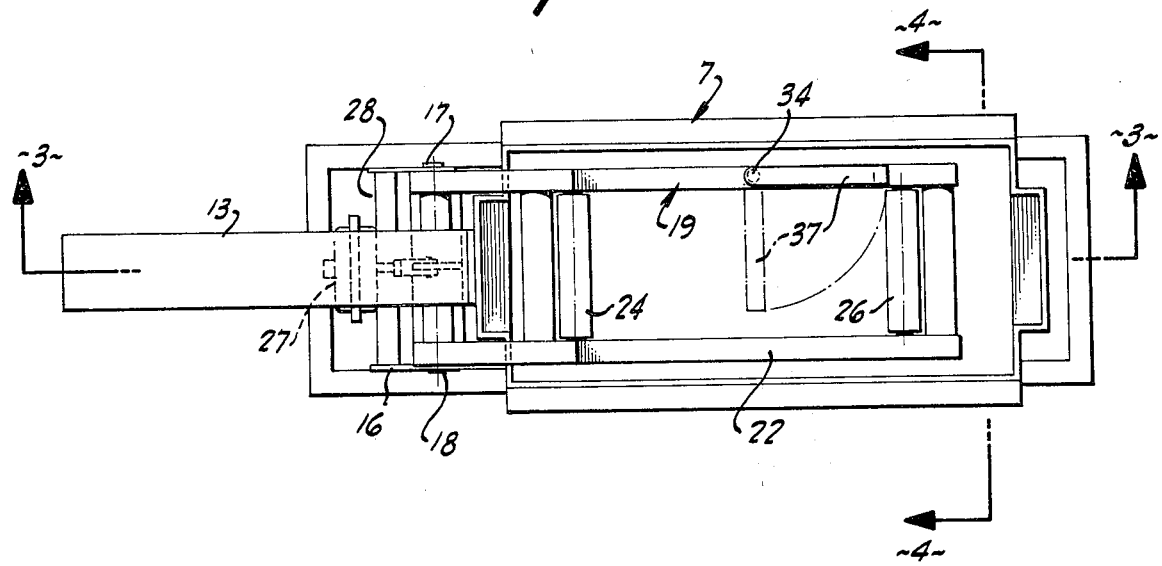
FIG. 1 is a top plan of a tire checking machine constructed pursuant to the invention.
Figure 4:
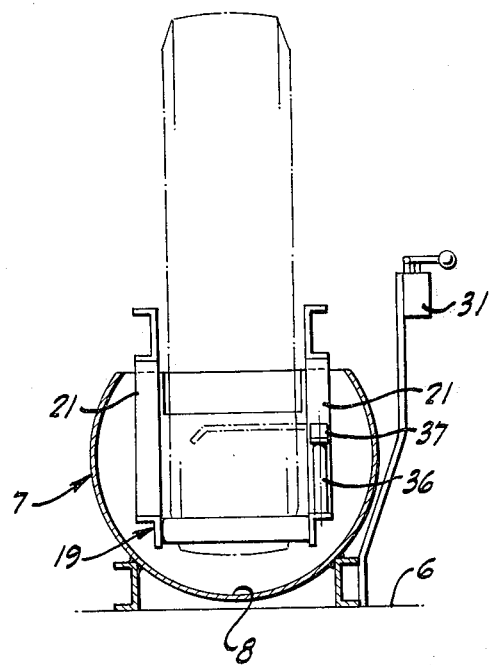
FIG. 4 is a cross-section on a vertical plane indicated by the line 4—4 of FIG. 1.

While the tire checking machine of the invention can be employed in various different environments, and can be constructed in a number of variant ways, it has with substantial success been incorporated as shown herein. In this instance the installation is made on the floor 6 of a tire shop, garage or the like, and includes primarily a tank 7 constructed of sheet metal in the customary fashion and having not only the usual bottom 8 but also upstanding sides such as 9 and 11. Arranged alongside the tank, and preferably fastened thereto, is a ramp frame 12 having an inclined ramp surface plate 13 which extends at a convenient small angle from the surface of the floor 6 up to the top edge of the wall 9. Disposed adjacent the tank and the ramp is a frame 16 of structural shape designed to rest upon the floor 6 and to extend upwardly in order to support a pair of pivot shafts 17 and 18 on opposite sides of the ramp.

Pivotally supported on the shafts 17 and 18 is a carrier frame 19 inclusive of inverted U-shaped or vertical arms 21 directly secured to the pivots 17 and 18, and horizontal arms 22 connected to the vertical arms 21. While the arms 21 and 22 are not always vertical or horizontal exactly, they are so denominated from their usual testing position.

The arms 22 are spaced apart transversely something more than the normal lateral dimension of the largest tire to be handled by the checking machine, and the space between such arms is spanned by a pair of rollers 24 and 26 appropriately journalled so that they can rotate freely at all times.

In order to operate the carrier about the pivot axis of the pivots 17 and 18, there is provided an air jack 27 of any convenient form, such as an expansible chamber which is joined by a bracket 28 to one part of the framework 16, and is joined by a pivoted rod 29 to the carrier vertical arms 21. Extending to the jack 27 is an air line 31 having the customary sort of control valve therein and extending also to a source of shop air, so that by operating the control (not shown) the jack can be expanded or retracted.

Figure 2:
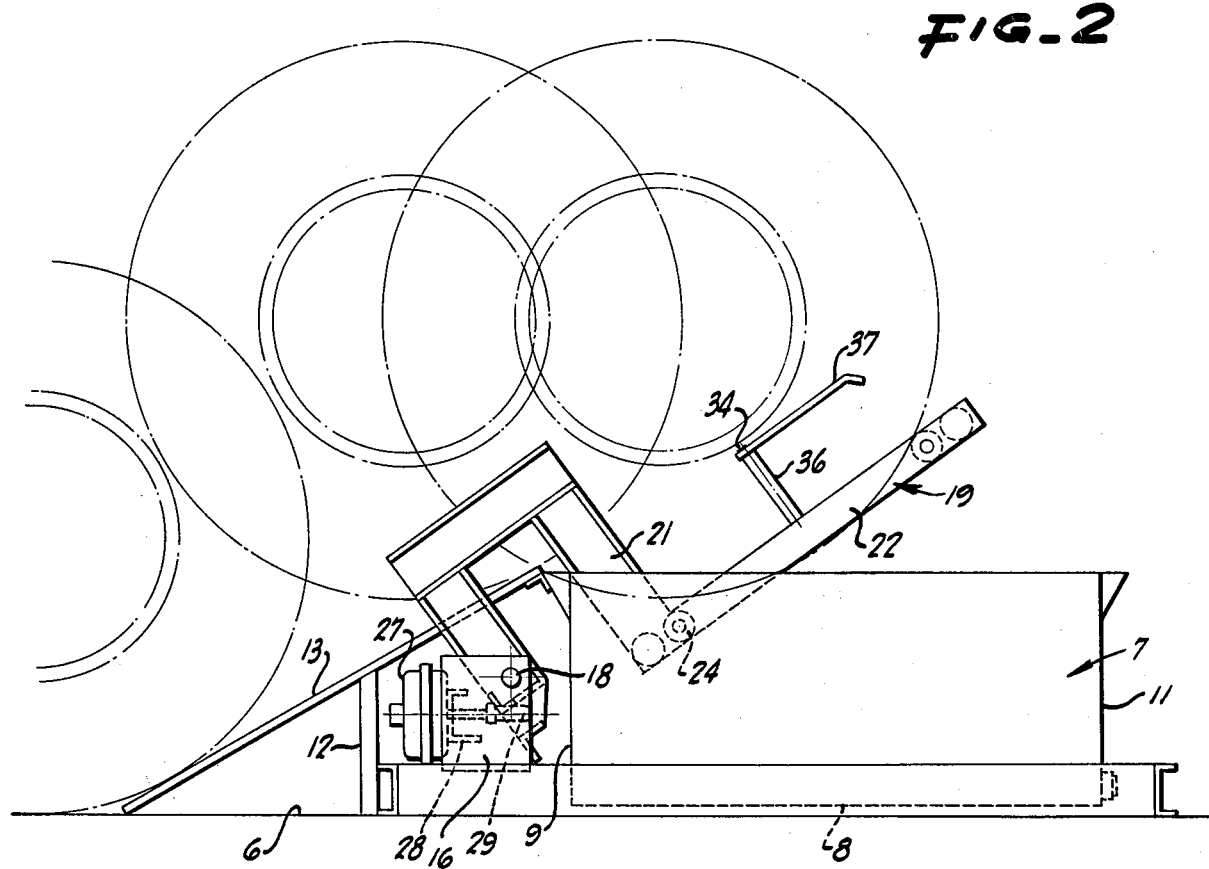
FIG. 2 is a side elevation of the tire checking machine shown in a loading position.
Figure 3:
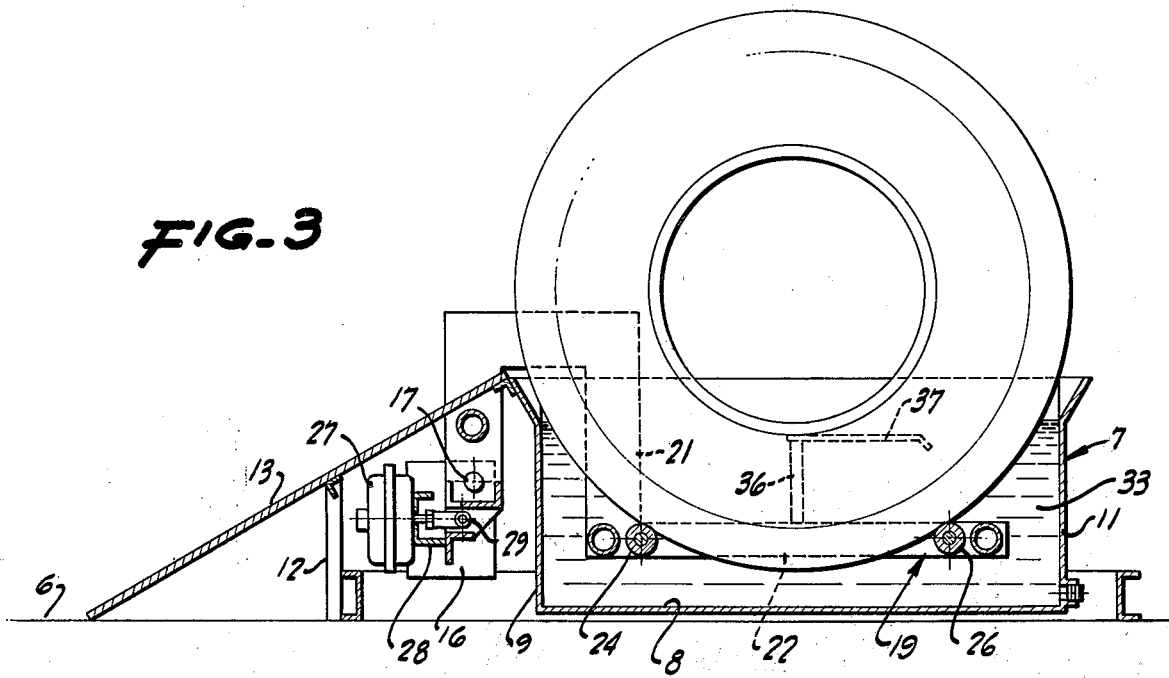
FIG. 3 is a cross-section of the tire checking machine showing a tire in the tank, the plane of cross-section being indicated by the line 3—3 of FIG. 1.

In the working of the checking machine, the air jack is provided with air under pressure to lift the carrier into the position shown in FIG. 2 with the horizontal arms 22 approximately in angular alignment with the surface plate 13 of the ramp 12. The user rolls a heavy tire, usually mounted on a wheel, up the ramp 13 and over the hump at the end of the ramp and onto the carrier. The tire finally comes to rest in contact with the two rollers 24 and 26, and because of its arcuate curvature depends somewhat below the horizontal arms 22.

With the tire so positioned, the user exhausts the air from the jack 27 whereupon the unbalanced weight of the carrier, tire and wheel group causes the carrier to descend slowly about the axis of the pivots 17 and 18 until the tire lower section is entirely immersed in a body of water 33 in the tank 7. The tire casing is then rotated by hand so that all portions of it are submerged at one time or another and can be observed for leaks.

When the testing or checking is finished, the operator again supplies air to the jack 27 thus lifting the carrier and the supported tire thereon into a position so that with slight effort the tire can be rolled over the roller 24 and again onto and then down the ramp plate 13 for use.

It is sometimes desired to test an inner tube which is not mounted but is simply by itself. For that reason, on one of the carrier horizontal arms 22 there is provided an upright pivot pin 34 on which is journalled the hub 36 of a retaining finger 37. The finger is rotatable between two positions, one of which is substantially overlying a side arm of the carrier, and the other of which is extended over or spanning the space between the side horizontal arms of the carrier. The vertical position of the arm 37 is such that when the carrier is lowered to its utmost extent, the arm is submerged in the water 33.

In the use of this mechanism the finger 37 is swung into vertical registry with the carrier arm and the inner tube is mounted lightly on the rollers 24 and 26. As it rests thereon with the carrier in its elevated position, the finger 37 is swung into its transverse location overlying the inner portion of the inner tube. The jack 27 is then actuated so that the carrier lowers and the extended finger 37 depresses the inner tube therewith until such time as the subjacent portion of the inner tube is submerged in the water body 33. Thereupon the inner tube can be rotated just as the tire casing was, and thereby it can be observed for leaks. Following the checking, the air jack 27 is again provided with air pressure to lift the carrier out of the water, the finger 37 is swung from its transverse position to its inactive position and the inner tube is readily lifted off of the supporting rollers 24 and 26.

What is claimed is:

1. A tire checking machine comprising a water tank having upstanding sides, a ramp leading from the floor substantially to the top of one of said sides, a frame adjacent said tank, an L-shaped carrier having a horizontal arm and a vertical arm, means for pivoting said carrier on said frame to move said horizontal arm between a lower position in said tank and an upper position above said tank and in substantial alignment with said ramp, a pair of rollers on said horizontal arm in position to support a tire thereon, and an operating jack connected to said frame and to said vertical arm for moving said carrier.

2. A device as in claim 1 including means on said horizontal arm extending transversely thereover at a predetermined distance above said rollers.

3. A device as in claim 2 in which said means includes a rod mounted on said arm for pivotal movement about a substantially vertical axis.

4. A device as in claim 1 in which the travel of said carrier between said lower position and said upper position is sufficient to shift the center of gravity of a tire on said roller between a first position substantially over said tank and a second position approximately over said ramp.

5. A device as in claim 1 in which said carrier includes a pair of similar side members transversely spaced apart more than the transverse dimension of a tire to be checked on said machine and said rollers span said side members and are spaced apart to support a tire resting thereon and disposed between said side members.

6. A device as in claim 5 including a bar extending between said side members in the vertical arm position thereof, and in which said operating jack is connected to said bar.

* * * * *